(12) United States Patent
Honda et al.

(10) Patent No.: US 7,268,820 B2
(45) Date of Patent: Sep. 11, 2007

(54) VIDEO SIGNAL CONVERSION APPARATUS DELIVERING ENHANCED DISPLAY QUALITY FOR VIDEO SIGNALS FROM FILM AND VIDEO SOURCES

(75) Inventors: Hirofumi Honda, Tokyo (JP); Tetsuya Shigeta, Yamanashi-ken (JP); Tetsuro Nagakubo, Tokyo (JP)

(73) Assignee: Pioneer Corporation, Tokyo (JP)

( * ) Notice: Subject to any disclaimer, the term of this patent is extended or adjusted under 35 U.S.C. 154(b) by 487 days.

(21) Appl. No.: 10/893,409

(22) Filed: Jul. 19, 2004

(65) Prior Publication Data

US 2005/0024534 A1 Feb. 3, 2005

(30) Foreign Application Priority Data

Jul. 31, 2003 (JP) ............................. 2003-204412

(51) Int. Cl.
  H04N 7/01 (2006.01)
  H04N 11/20 (2006.01)

(52) U.S. Cl. ...................... 348/441; 348/448; 348/554; 348/558

(58) Field of Classification Search ................ 348/554, 348/555, 556, 558, 441, 97, 705, 706, 448, 348/458, 445
See application file for complete search history.

(56) References Cited

U.S. PATENT DOCUMENTS 5,132,793 A * 7/1992 Hirahata et al. ............ 348/556
5,428,399 A * 6/1995 Robinson et al. ........... 348/459
5,457,499 A * 10/1995 Lim ............................ 348/474
5,485,216 A * 1/1996 Lee ............................. 348/443
5,754,248 A * 5/1998 Faroudja ..................... 348/474
6,144,412 A * 11/2000 Hirano et al. ............... 348/441
6,222,589 B1 4/2001 Faroudja et al.
6,380,978 B1 * 4/2002 Adams et al. ............... 348/452
6,597,402 B1 7/2003 Butler et al.
6,839,094 B2 * 1/2005 Tang et al. .................. 348/607
7,154,555 B2 * 12/2006 Conklin ...................... 348/448
2002/0075412 A1 6/2002 Tang et al.

FOREIGN PATENT DOCUMENTS

EP 0 566 229 A2 10/1993
EP 0 720 366 A2 7/1996
WO WO 01/80559 A2 10/2001

* cited by examiner

*Primary Examiner*—Victor R. Kostak
(74) *Attorney, Agent, or Firm*—Sughrue Mion, PLLC

(57) ABSTRACT

A video signal conversion apparatus which can enhance display qualities for video signals of both film source and video source. The conversion apparatus includes an input signal discrimination unit which discriminates the sort and signal supply source of an input video signal, and an operation mode setting unit which sets the operation modes of the individual sorts of video signals for each of a plurality of signal supply sources. The operation mode which corresponds to the sort and signal supply source of the input video signal as discriminated by the input signal discrimination unit is obtained from the operation mode setting unit, and the operation of at least one of a film source discrimination unit, an interlace/progressive conversion unit and a frame rate conversion unit is controlled in accordance with the obtained operation mode.

6 Claims, 4 Drawing Sheets

FIG. 2

| SIGNAL SUPPLY SOURCE | SIGNAL SORT | SETTING DATA | FLAG | PULLDOWN DETECTOR | I/P CONVERTER | PICTURE QUALITY ADJUSTMENT CIRCUIT | | | FRAME RATE CONVERTER | SEQUENCE GENERATION CIRCUIT |
|---|---|---|---|---|---|---|---|---|---|---|
| | | | | | | SHARP | | 2DNR | | |
| GROUND WAVE BROADCAST | CVBS | OFF | | | MOTION ADAPTIVE INTERPOLATION | HIGH | | MEDIUM | NON-CONVERSION | 60Hz SEQUENCE |
| | CVBS | ON | | DETECTION OPERATION | MOTION ADAPTIVE INTERPOLATION PROCESS OR INTER-FIELD INTERPOLATION PROCESS | MEDIUM | | LOW | NON-CONVERSION | 60Hz SEQUENCE |
| VTR | CVBS | OFF | | | MOTION ADAPTIVE INTERPOLATION | HIGH | | MEDIUM | NON-CONVERSION | 60Hz SEQUENCE |
| | CVBS | ON | | DETECTION OPERATION | MOTION ADAPTIVE INTERPOLATION PROCESS OR INTER-FIELD INTERPOLATION PROCESS | MEDIUM | | LOW | NON-CONVERSION | 60Hz SEQUENCE |
| DVD | 480i | OFF | | | MOTION ADAPTIVE INTERPOLATION | HIGH | | MEDIUM | NON-CONVERSION | 60Hz SEQUENCE |
| | | ON | | DETECTION OPERATION | MOTION ADAPTIVE INTERPOLATION PROCESS OR INTER-FIELD INTERPOLATION PROCESS | MEDIUM | | LOW | NON-CONVERSION | 60Hz SEQUENCE |
| | | ADVANCED | | DETECTION OPERATION | MOTION ADAPTIVE INTERPOLATION PROCESS OR INTER-FIELD INTERPOLATION PROCESS | MEDIUM | | LOW | CONVERSION (60Hz→72Hz) | 72Hz SEQUENCE |
| | 480p | OFF | | | THROUGH | HIGH | | MEDIUM | NON-CONVERSION | 60Hz SEQUENCE |
| | | ADVANCED | | | THROUGH | MEDIUM | | LOW | CONVERSION (60Hz→72Hz) | 72Hz SEQUENCE |
| DIGITAL BROADCAST | 480i | OFF | | | MOTION ADAPTIVE INTERPOLATION | HIGH | | MEDIUM | NON-CONVERSION | 60Hz SEQUENCE |
| | | ON | ABSENT | DETECTION OPERATION | MOTION ADAPTIVE INTERPOLATION PROCESS OR INTER-FIELD INTERPOLATION PROCESS | MEDIUM | | LOW | NON-CONVERSION | 60Hz SEQUENCE |
| | | | PRESENT | USE OF FLAG | MOTION ADAPTIVE INTERPOLATION PROCESS OR INTER-FIELD INTERPOLATION PROCESS | MEDIUM | | LOW | CONVERSION (60Hz→72Hz) | 72Hz SEQUENCE |
| | | ADVANCED | ABSENT | DETECTION OPERATION | MOTION ADAPTIVE INTERPOLATION PROCESS OR INTER-FIELD INTERPOLATION PROCESS | MEDIUM | | LOW | CONVERSION (60Hz→72Hz) | 72Hz SEQUENCE |
| | | | PRESENT | USE OF FLAG | MOTION ADAPTIVE INTERPOLATION PROCESS OR INTER-FIELD INTERPOLATION PROCESS | MEDIUM | | LOW | CONVERSION (60Hz→72Hz) | 72Hz SEQUENCE |
| | 480p | OFF | | | THROUGH | HIGH | | MEDIUM | NON-CONVERSION | 60Hz SEQUENCE |
| | | ADVANCED | ABSENT | DETECTION OPERATION | THROUGH | MEDIUM | | LOW | CONVERSION (60Hz→72Hz) | 72Hz SEQUENCE |
| | | | PRESENT | USE OF FLAG | THROUGH | MEDIUM | | LOW | CONVERSION (60Hz→72Hz) | 72Hz SEQUENCE |
| | 720p | OFF | | | THROUGH | MEDIUM | | MEDIUM | NON-CONVERSION | 60Hz SEQUENCE |
| | | ADVANCED | ABSENT | DETECTION OPERATION | THROUGH | LOW | | LOW | CONVERSION (60Hz→72Hz) | 72Hz SEQUENCE |
| | | | PRESENT | USE OF FLAG | THROUGH | LOW | | LOW | CONVERSION (60Hz→72Hz) | 72Hz SEQUENCE |
| | 1080i | OFF | | | MOTION ADAPTIVE INTERPOLATION | MEDIUM | | MEDIUM | NON-CONVERSION | 60Hz SEQUENCE |
| | | ON | ABSENT | DETECTION OPERATION | MOTION ADAPTIVE INTERPOLATION PROCESS OR INTER-FIELD INTERPOLATION PROCESS | LOW | | LOW | NON-CONVERSION | 60Hz SEQUENCE |
| | | | PRESENT | USE OF FLAG | MOTION ADAPTIVE INTERPOLATION PROCESS OR INTER-FIELD INTERPOLATION PROCESS | LOW | | LOW | CONVERSION (60Hz→72Hz) | 72Hz SEQUENCE |
| | | ADVANCED | ABSENT | DETECTION OPERATION | MOTION ADAPTIVE INTERPOLATION PROCESS OR INTER-FIELD INTERPOLATION PROCESS | LOW | | LOW | CONVERSION (60Hz→72Hz) | 72Hz SEQUENCE |
| | | | PRESENT | USE OF FLAG | MOTION ADAPTIVE INTERPOLATION PROCESS OR INTER-FIELD INTERPOLATION PROCESS | LOW | | LOW | CONVERSION (60Hz→72Hz) | 72Hz SEQUENCE |

FIG. 3

| SIGNAL SUPPLY SOURCE | SIGNAL SORT | SETTING DATA |
|---|---|---|
| GROUND WAVE BROADCAST | CVBS | OFF |
| VTR | CVBS | ON |
| DVD | 480 i | ADVANCED |
| DVD | 480 p | ADVANCED |
| DIGITAL BROADCAST | 480 i | OFF |
| DIGITAL BROADCAST | 480 p | OFF |
| DIGITAL BROADCAST | 720 p | OFF |
| DIGITAL BROADCAST | 1080 i | OFF |

VIDEO SIGNAL CONVERSION APPARATUS DELIVERING ENHANCED DISPLAY QUALITY FOR VIDEO SIGNALS FROM FILM AND VIDEO SOURCES

BACKGROUND OF THE INVENTION

1. Field of the Invention

The present invention relates to a video signal conversion apparatus which converts an input video signal so as to be displayable on a display apparatus with a high picture quality.

2. Description of the Related Art

Video signals of film source based on movies or films are often contained in video signals of standard television systems such as the NTSC format. The movie or film consists of 24 frames per second. On the other hand, the video signal of the standard television system consists of 30 frames per second, and it is a video signal of interlaced scanning in which one frame is constituted by 2 fields. Since the numbers of frames per second are different, the frames of the movie or film are usually subjected to television-cinema conversion by a 2-3 pulldown scheme so as to obtain the video signal of the standard television system.

With the 2-3 pulldown scheme, the first and second fields of the first frame of the video signal are created from the first frame of the movie or film, the first and second fields of the second frame and the first field of the third frame of the video signal from the second frame, and the second field of the third frame and the first field of the fourth frame of the video signal from the third frame. Regarding the subsequent frames, the video signal is created for 2 fields, for 3 fields, for 2 fields, for 3 fields, . . . from the successive frames of the film by similar conversion steps.

In this way, the movie or film is converted into that video signal of the standard television system in which the 2 frames of the former correspond to the 5 frames of the latter, and in which the video signal of 2 fields and the video signal of 3 fields are alternately repeated in correspondence with the frames of the movie or film.

Meanwhile, in a case where a picture based on the video signal of interlaced scanning subjected to the television-cinema conversion in this manner is displayed by a display apparatus such as PDP, the above-mentioned third frame, for example, in the successive frames of the video signal is formed of the combination between the pictures of the second frame and third frame of the movie or film. This has posed the problem that the video signal is inferior in picture quality to the original movie or film. It has been necessary for coping with the problem to discriminate whether an input video signal is a video signal of film source or a video signal of so-called "video source" unlike the video signal of film source, and to execute the process of picture quality adjustment for the video signal of film source.

In this regard, however, there has been the problem that the discrimination concerning whether or not the input video signal is the video signal based on the film source does not stably operate in some cases, due to the differences of the signal supply sources of input video signals, so a good picture quality is sometimes unobtainable.

SUMMARY OF THE INVENTION

Therefore, the present invention is intended to solve the above problem mentioned by way of example, and it has for its object to provide a video signal conversion apparatus which can enhance display qualities for video signals of both the film source and the video source.

A video signal conversion apparatus according to claim 1 of the present invention consists in a video signal conversion apparatus wherein an input video signal is converted into a progressive video signal of predetermined frame rate, characterized by comprising a film source discrimination unit which discriminates whether or not the input video signal is a video signal of film source as based on a film; an interlace/progressive conversion unit which, when the input video signal is an interlaced video signal, converts the input video signal into the progressive video signal by a conversion method conforming to a result of the discrimination by said film source discrimination unit and then outputs the progressive video signal, and which, when the input video signal is not the interlaced video signal, outputs the input video signal as it is; a frame rate conversion unit which converts the output video signal of said interlace/progressive conversion unit into a video signal of higher frame rate in accordance with the result of the discrimination by said film source discrimination unit; an input signal discrimination unit which discriminates a sort and a signal supply source of the input video signal; an operation mode setting unit which sets operation modes of individual sorts of video signals of each of a plurality of signal supply sources; and a control unit which obtains from said operation mode setting unit, the operation mode corresponding to the sort and the signal supply source of the input video signal as discriminated by said input signal discrimination unit, and which controls an operation of at least one of said film source discrimination unit, said interlace/progressive conversion unit and said frame rate conversion unit in accordance with the obtained operation mode.

BRIEF DESCRIPTION OF THE DRAWINGS

FIG. 2 is a diagram showing the operations of individual units in the apparatus, as to respective setting data "on", "off" and "advanced" for the individual signal sorts of signal supply sources;

FIG. 3 is a diagram showing examples of setting data stored in a setting data memory.

DETAILED DESCRIPTION OF THE INVENTION

Now, embodiments of the present invention will be described in detail with reference to the drawings.

Figure 1:
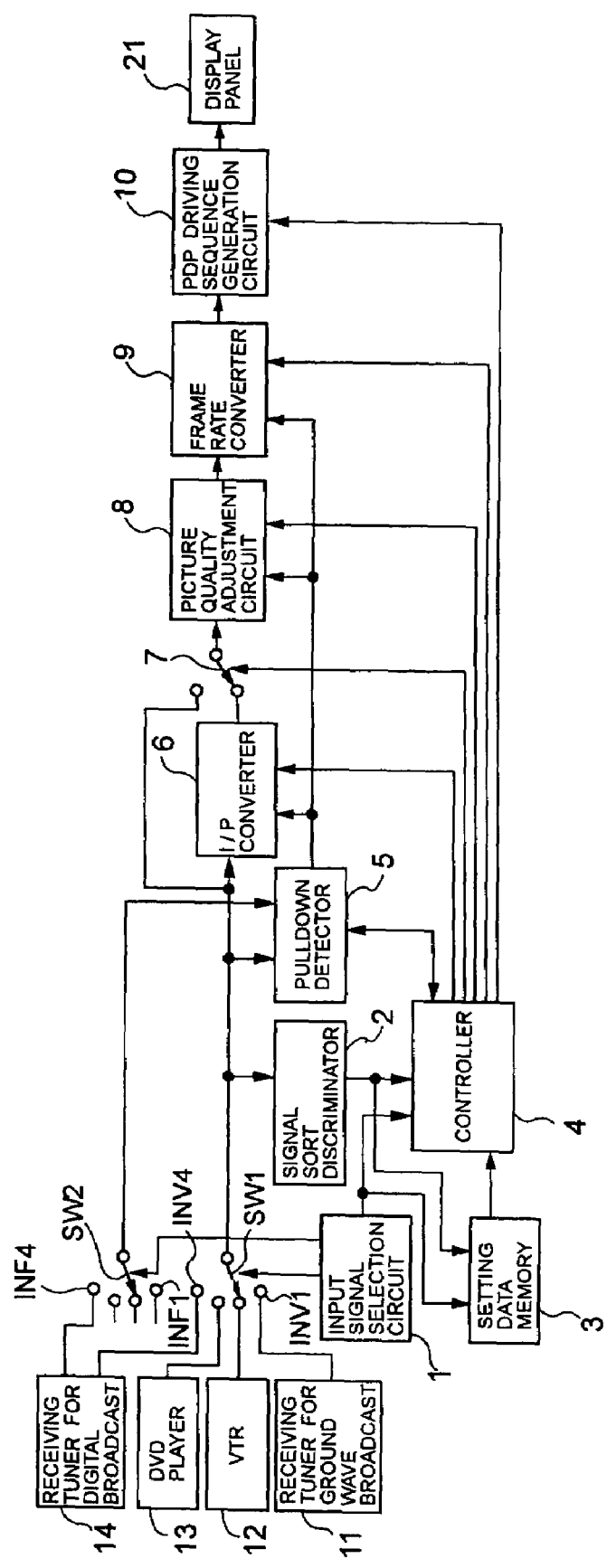
FIG. 1 is a block diagram showing the construction of a video signal conversion apparatus according to the present invention.

FIG. 1 shows a video signal conversion apparatus according to the present invention. The video signal conversion apparatus includes an input signal selection circuit 1, a signal sort discriminator 2, a setting data memory 3, a controller 4, a pulldown detector 5, an I/P (interlace/progressive) converter 6, a changeover switch 7, a picture quality adjustment circuit 8, a frame rate converter 9 and a PDP driving sequence generation circuit 10. Also, the video signal conversion apparatus has video signal input terminals INV1-INV4, external flag input terminals INF1-INF4, and changeover switches SW1 and SW2. Signal supply sources are connected to the respective video signal input terminals INV1-INV4, and video signals are supplied from the signal supply sources. In this embodiment, a receiving tuner 11 for a ground wave broadcast, a video tape recorder (VTR) 12, a DVD player 13 and a receiving tuner 14 for a digital broadcast are employed as the signal supply sources. The video signal output terminals of the signal supply sources 11-14 are connected to the video signal input terminals INV1-INV4 in the order mentioned. In this embodiment, among the signal supply sources 11-14, the receiving tuner 14 for the digital broadcast is provided with a flag output terminal, which is connected to the external flag input terminal INF4. The external flag input terminals, for example, INF1-INF3 which correspond to the signal supply sources having no flag output terminals are held open. The receiving tuner 14 delivers from the flag output terminal, an Mpeg flag which indicates whether or not the video signal being outputted is a video signal of film source based on a film.

The output video signals of the respective signal supply sources 11-14 are all digital signals. The receiving tuner 11 for the ground wave broadcast and the video tape recorder 12 output video signals of NTSC format, respectively. The DVD player 13 outputs an interlaced video signal or a progressive video signal which has 480 scanning lines. The receiving tuner 14 for the digital broadcast outputs any of an interlaced video signal having 480 scanning lines, a progressive video signal having 480 scanning lines, a progressive video signal having 720 scanning lines, and an interlaced video signal having 1080 scanning lines.

Each of the changeover switches SW1 and SW2 is a switch which has four stationary contacts, and in which any of the stationary contacts is selectively connected by a movable contact in accordance with a selection command signal from the input signal selection circuit 1. The video signal input terminals INV1-INV4 are respectively connected to the stationary contacts of the changeover switch SW1. The external flag input terminals INF1-INF4 are respectively connected to the stationary contacts of the changeover switch SW2. The changeover switch SW1 relays and supplies the video signal supplied to the selected and connected stationary contact, to the signal sort discriminator 2, pulldown detector 5 and I/P converter 6. The changeover switch SW2 relays and supplies the flag supplied to the selected and connected stationary terminal, to the pulldown detector 5.

The input signal selection circuit 1 includes an operating portion not shown, and it outputs to the changeover switches SW1 and SW2, the selection command signals for changing-over the selected positions of these changeover switches SW1 and SW2 in accordance with the user's operations of the operating portion. Besides, the input signal selection circuit 1 supplies the setting data memory 3 and the controller 4 with signal supply source data which indicates the input terminal currently under selection (any of "ground wave broadcast", "VTR", "DVD" and "digital broadcast"). Incidentally, since the corresponding relations between the input terminals INV1-INV4 and the signal supply sources 11-14 are fixed, the signal supply source data which indicates the input terminal currently under selection is obtained in correspondence with the selected position of the changeover switch SW1.

The signal sort discriminator 2 discriminates the sort of the video signal selected and relayed by the changeover switch SW1. The sorts of video signals are divided into standard video signals (CVBS) such as the video signal of NTSC format, and the other video signals. Further, the other video signals are divided depending upon the number of scanning lines, and interlace/non-interlace. Signal sort data which indicates a result discriminated by the signal sort discriminator 2, is supplied to the setting data memory 3 and the controller 4. The input signal selection circuit 1 and the signal sort discriminator 2 constitute input signal discrimination means.

The setting data memory 3 is operation mode setting means. Setting data which indicate operation modes in the individual sorts of the video signals of the respective signal supply sources, are written in the setting data memory 3 beforehand. The setting data determine the respective control states of the pulldown detector 5, I/P converter 6, changeover switch 7, picture quality adjustment circuit 8, frame rate converter 9 and PDP driving sequence generation circuit 10 based on the controller 5. In the setting data memory 3, the setting data is read out from a storage location specified in accordance with the signal supply source data from the input signal selection circuit 1 and the signal sort data from the signal sort discriminator 2, by the controller 4. The setting data is any of "on", "off" and "advanced". Incidentally, the controller 4 may well designate the storage location of the setting data memory 3 in accordance with the signal supply source data from the input signal selection circuit 1 and the signal sort data from the signal sort discriminator 2, so as to read out the setting data from the designated storage location.

The controller 4 is control means, and it generates various instructions for controlling the respective operations of the pulldown detector 5, I/P converter 6, changeover switch 7, picture quality adjustment circuit 8, frame rate converter 9 and PDP driving sequence generation circuit 10, on the basis of the setting data supplied from the setting data memory 3.

The pulldown detector 5 is film source discrimination means. When a detection command has been generated from the controller 4, the pulldown detector 5 detects whether or not the video signal selected and relayed by the changeover switch SW1 is a video signal of film source converted by a 2-2 or 2-3 pulldown scheme. The result of the detection is supplied as a signal to the I/P converter 6. Besides, when the pulldown detector 5 is supplied with the flag through the changeover switch SW2, it supplies the I/P converter 6 with the content of the flag, that is, a signal which corresponds to whether or not the selected and relayed video signal is the video signal of film source.

The I/P converter 6 constructs interlace/progressive conversion means, together with the changeover switch 7. In a case where an I/P conversion command has been generated from the controller 4, and where the signal from the pulldown detector 5 indicates the video signal of film source, the I/P converter 6 converts the video signal selected and relayed by the changeover switch SW1, into a progressive video signal on the basis of an inter-field interpolation process. Besides, in a case where the I/P conversion command has been generated from the controller 4, but where the signal from the pulldown detector 5 does not indicate the detection of the video signal of film source, the I/P converter 6 converts the video signal selected and relayed by the changeover switch SW1, into a progressive video signal on the basis of a motion adaptive interpolation process.

The changeover switch 7 outputs either of the video signal selected and relayed by the changeover switch SW1 and the video signal outputted from the I/P converter 6, to the picture quality adjustment circuit 8 in accordance with a selection command from the controller 4.

The picture quality adjustment circuit 8 executes the "sharp" process and two-dimensional noise reduction process of a picture quality for the video signal relayed from the changeover switch 7, in accordance with a picture quality adjustment command from the controller 4. Each of the processes is performed at any of low, medium and high levels.

The frame rate converter 9 converts the video signal outputted from the picture quality adjustment circuit 8, from 60 Hz to 72 Hz in accordance with a frame rate conversion command from the controller 4. Besides, when supplied with a non-conversion command from the controller 4, the frame rate converter 9 outputs the video signal delivered from the picture quality adjustment circuit 8, as it is.

The PDP driving sequence generation circuit 10 drives a PDP display panel 21 in accordance with the output video signal of the frame rate converter 9.

In the video signal conversion apparatus of such a construction, as shown in FIG. 2, the presence or absence of the pulldown detection operation of the pulldown detector 5, the content of the conversion operation of the I/P converter 6, the degree of the adjustment of each of the "sharp" and two-dimensional noise reduction (2DNR) processes of the picture quality adjustment circuit 8, the presence or absence of the conversion operation of the frame rate converter 9, and the frequency of the drive sequence of the PDP driving sequence generation circuit 10 are preset as to the respective setting data "on", "off" and "advanced" for the signal sorts of the signal supply sources 11-14. The controller 5 stores the corresponding relations of FIG. 2 as control information therein, and it generates the above instructions in control patterns which are determined in accordance with the control information of the corresponding relations and the setting data in the setting data memory 3.

Besides, as shown in FIG. 2, when the external flag has been supplied to the pulldown detector 5, the pulldown detection operation of this pulldown detector 5 is not performed, and whether or not the relayed video signal is the video signal converted by the pulldown scheme is determined in accordance with the content of the external flag.

In the setting data memory 3, the setting data are stored as shown in FIG. 3 by way of example. The setting data may be held at initial values at factory shipment, but they may well be made settable at will through the operation of the user. In the ground wave broadcast, a reception quality worsens due to a weak electric field or ghost, and in the digital broadcast, a ground wave broadcast of inferior picture quality is sometimes up-converted. In the setting data example of FIG. 3, therefore, the setting data for the ground wave broadcast and the digital broadcast are set at "off" in consideration of a case where the pulldown detector 5 does not operate stably. Besides, the setting data for the DVD, in which the video signal indicating the movie is recorded in most cases, is set at "advanced". Regarding the VTR, the setting data is set at "off" so that the frame rate conversion into 72 Hz may not be performed in consideration of the jitter of a vertical synchronizing signal.

In a case where a ground-wave-broadcast reception mode has been selected by the user's operation, the selection positions of the changeover switches SW1 and SW2 become the side of the video signal input terminal INV1 and the side of the external flag input terminal INF1 in accordance with the signal supply source data "ground wave broadcast" from the input signal selection circuit 1, respectively. It is assumed that the output video signal of the receiving tuner 11 for the ground wave broadcast as relayed by the changeover switch SW1 has been discriminated as the video signal of NTSC format by the signal sort discriminator 2. The signal sort data "CVBS" being the result of the discrimination is supplied to the setting data memory 3 and the controller 4. Here, if the setting data of a storage location designated in accordance with the signal sort data "CVBS" and the signal supply source data "ground wave broadcast" from the input signal selection circuit 1 is "on" in the setting data memory 3, then this setting data "on" is read out by the controller 4.

Accordingly, the controller 4 is supplied with the signal supply source data "ground wave broadcast" and the signal sort data "CVBS" in addition to the setting data "on". As shown in FIG. 2, the controller 4 instructs the pulldown detector 5 to execute the pulldown detection operation, it instructs the I/P converter 6 to perform the interpolation process corresponding to the result of the pulldown detection based on the pulldown detector 5, it instructs the changeover switch 7 to select the output of the I/P converter 6, it instructs the picture quality adjustment circuit 8 to execute the "sharp" process of medium level and the two-dimensional noise reduction process of low level, it instructs the frame rate converter 9 to perform no conversion, and it instructs the sequence generation circuit 10 to implement the drive sequence of 60 Hz.

Owing to the instructions, in a case where the video signal selected and relayed by the changeover switch SW1 has been detected as the pulldown detection result to be the video signal of pulldown scheme, namely, the video signal of film source, it is converted into the progressive video signal by the inter-field interpolation process in the I/P converter 6. In a case where the relayed video signal has been detected not to be the video signal of film source, it is converted into the progressive video signal by the motion adaptive interpolation process in the I/P converter 6. After having been converted into the progressive video signal, the video signal is supplied to the picture quality adjustment circuit 8 through the changeover switch 7. In the picture quality adjustment circuit 8, the video signal is subjected to the "sharp" process of the picture quality at the medium level and the two-dimensional noise reduction process at the low level. The video signal subjected to the picture quality adjustment by the picture quality adjustment circuit 8 is supplied to the PDP driving sequence generation circuit 10 with its own vertical synchronizing frequency of 60 Hz without undergoing the frame rate conversion in the frame rate converter 9. The PDP driving sequence generation circuit 10 drives the PDP or display panel 21 in the 60 Hz sequence in accordance with the video signal having the vertical synchronizing frequency of 60 Hz.

If, in the ground-wave-broadcast reception mode, the setting data "off" has been read out from the setting data memory 3 by the controller 4, then the controller 4 instructs the pulldown detector 5 to execute no pulldown detection operation as shown in FIG. 2, it instructs the I/P converter 6 to perform the motion adaptive interpolation process, it instructs the changeover switch 7 to select the output of the I/P converter 6, it instructs the picture quality adjustment circuit 8 to execute the "sharp" process of high level and the two-dimensional noise reduction process of medium level, it instructs the frame rate converter 9 to perform no conversion, and it instructs the sequence generation circuit 10 to implement the 60 Hz drive sequence.

Owing to the instructions, the video signal selected and relayed by the changeover switch SW1 is converted into the progressive video signal by the motion adaptive interpolation process in the I/P converter 6, and it is thereafter supplied to the picture quality adjustment circuit 8 through the changeover switch 7. In the picture quality adjustment circuit 8, the video signal is subjected to the "sharp" process of the picture quality at the high level and the two-dimensional noise reduction process at the medium level. The video signal subjected to the picture quality adjustment by the picture quality adjustment circuit 8 is supplied to the PDP driving sequence generation circuit 10 with its own vertical synchronizing frequency of 60 Hz without undergoing the frame rate conversion in the frame rate converter 9. The PDP driving sequence generation circuit 10 drives the PDP or display panel 21 in the 60 Hz sequence in accordance with the video signal having the vertical synchronizing frequency of 60 Hz.

Next, in a case where a VTR playback mode based on the video tape recorder 12 has been selected by the user's operation, the selection positions of the changeover switches SW1 and SW2 become the side of the video signal input terminal INV2 and the side of the external flag input terminal INF2 in accordance with the signal supply source data "VTR" from the input signal selection circuit 1, respectively. It is assumed that the output video signal of the video tape recorder 12 as relayed by the changeover switch SW1 has been discriminated as the video signal of NTSC format by the signal sort discriminator 2. The signal sort data "CVBS" of the result being the discrimination is supplied to the setting data memory 3 and the controller 4. Here, if the setting data of a storage location designated in accordance with the signal sort data "CVBS" and the signal supply source data "VTR" from the input signal selection circuit 1 is "on" in the setting data memory 3, then this setting data "on" is read out by the controller 4. In contrast, if the setting data of the designated storage location is "off", then this setting data "off" is read out by the controller 4.

Accordingly, respective instructions which are issued from the controller 4 in the case of the selection of the VTR playback mode are the same as those in the case of the selection of the ground-wave-broadcast reception mode, and hence, the respective operations of the pulldown detector 5, I/P converter 6, changeover switch 7, picture quality adjustment circuit 8, frame rate converter 9 and PDP driving sequence generation circuit 10 are also the same.

Subsequently, in a case where a DVD playback mode based on the DVD player 13 has been selected by the user's operation, the selection positions of the changeover switches SW1 and SW2 become the side of the video signal input terminal INV3 and the side of the external flag input terminal INF3 in accordance with the signal supply source data "DVD" from the input signal selection circuit 1, respectively. It is assumed that the output video signal of the DVD player 13 as relayed by the changeover switch SW1 has been discriminated as the video signal of 480i ("interlace" of 480 scanning lines) scheme by the signal sort discriminator 2. The signal sort data "480i" being the result of the discrimination is supplied to the setting data memory 3 and the controller 4. Here, if the setting data of a storage location designated in accordance with the signal sort data "480i" and the signal supply source data "DVD" from the input signal selection circuit 1 is "off" in the setting data memory 3, then this setting data "off" is read out by the controller 4.

The controller 4 is supplied with the signal supply source data "DVD" and the signal sort data "480i" in addition to the setting data "off". As shown in FIG. 2, the controller 4 instructs the pulldown detector 5 to execute no pulldown detection operation, it instructs the I/P converter 6 to perform the motion adaptive interpolation process, it instructs the changeover switch 7 to select the output of the I/P converter 6, it instructs the picture quality adjustment circuit 8 to execute the "sharp" process of high level and the two-dimensional noise reduction process of medium level, it instructs the frame rate converter 9 to perform no conversion, and it instructs the sequence generation circuit 10 to implement the drive sequence of 60 Hz.

Owing to the instructions, the video signal from the DVD player 13 as selected and relayed by the changeover switch SW1 is converted into the progressive video signal by the motion adaptive interpolation process in the I/P converter 6, and it is thereafter supplied to the picture quality adjustment circuit 8 through the changeover switch 7. In the picture quality adjustment circuit 8, the video signal is subjected to the "sharp" process of the picture quality at the high level and the two-dimensional noise reduction process at the medium level. The video signal subjected to the picture quality adjustment by the picture quality adjustment circuit 8 is supplied to the PDP driving sequence generation circuit 10 with its own vertical synchronizing frequency of 60 Hz without undergoing the frame rate conversion in the frame rate converter 9. The PDP driving sequence generation circuit 10 drives the PDP or display panel 21 in the 60 Hz sequence in accordance with the video signal having the vertical synchronizing frequency of 60 Hz.

If, for the signal sort data "480i" in the DVD playback mode, the setting data "on" has been read out from the setting data memory 3 by the controller 4, then the controller 4 instructs the pulldown detector 5 to execute the pulldown detection operation as shown in FIG. 2, it instructs the I/P converter 6 to perform the interpolation process corresponding to the result of the pulldown detection based on the pulldown detector 5, it instructs the changeover switch 7 to select the output of the I/P converter 6, it instructs the picture quality adjustment circuit 8 to execute the "sharp" process of medium level and the two-dimensional noise reduction process of low level, it instructs the frame rate converter 9 to perform no conversion, and it instructs the sequence generation circuit 10 to implement the 60 Hz drive sequence.

Owing to the instructions, in a case where the video signal from the DVD player 13 as selected and relayed by the changeover switch SW1 has been detected as the pulldown detection result to be the video signal of pulldown scheme, namely, the video signal of film source, it is converted into the progressive video signal by the inter-field interpolation process in the I/P converter 6. In a case where the relayed video signal has been detected not to be the video signal of film source, it is converted into the progressive video signal by the motion adaptive interpolation process in the I/P converter 6. After having been converted into the progressive video signal, the video signal is supplied to the picture quality adjustment circuit 8 through the changeover switch 7. In the picture quality adjustment circuit 8, the video signal is subjected to the "sharp" process of the picture quality at the medium level and the two-dimensional noise reduction process at the low level. The video signal subjected to the picture quality adjustment by the picture quality adjustment circuit 8 is supplied to the PDP driving sequence generation circuit 10 with its own vertical synchronizing frequency of 60 Hz without undergoing the frame rate conversion in the frame rate converter 9. The PDP driving sequence generation circuit 10 drives the PDP or display panel 21 in the 60 Hz sequence in accordance with the video signal having the vertical synchronizing frequency of 60 Hz.

If, in the DVD playback mode, the setting data "advanced" has been read out from the setting data memory 3 by the controller 4, then the controller 4 instructs the pulldown detector 5 to execute the pulldown detection operation as shown in FIG. 2, it instructs the I/P converter 6 to perform the interpolation process corresponding to the result of the pulldown detection based on the pulldown detector 5, it instructs the changeover switch 7 to select the output of the I/P converter 6, it instructs the picture quality adjustment circuit 8 to execute the "sharp" process of medium level and the two-dimensional noise reduction process of low level, it instructs the frame rate converter 9 to perform the conversion, and it instructs the sequence generation circuit 10 to implement the 72 Hz drive sequence.

Owing to the instructions, in a case where the video signal from the DVD player 13 as selected and relayed by the changeover switch SW1 has been detected as the pulldown detection result to be the video signal of pulldown scheme, namely, the video signal of film source, it is converted into the progressive video signal by the inter-field interpolation process in the I/P converter 6. In a case where the relayed video signal has been detected not to be the video signal of film source, it is converted into the progressive video signal by the motion adaptive interpolation process in the I/P converter 6. After having been converted into the progressive video signal, the video signal is supplied to the picture quality adjustment circuit 8 through the changeover switch 7. In the picture quality adjustment circuit 8, the video signal is subjected to the "sharp" process of the picture quality at the medium level and the two-dimensional noise reduction process at the low level. The video signal subjected to the picture quality adjustment by the picture quality adjustment circuit 8 has a vertical synchronizing frequency of 60 Hz, but it is converted into a video signal having a vertical synchronizing frequency of 72 Hz in the frame rate converter 9. The video signal after the conversion is supplied to the PDP driving sequence generation circuit 10. The PDP driving sequence generation circuit 10 drives the PDP or display panel 21 in the 72 Hz sequence in accordance with the video signal having the vertical synchronizing frequency of 72 Hz.

It is assumed that the output video signal of the DVD player 13 as relayed by the changeover switch SW1 has been discriminated as the video signal of 480p ("progressive" of 480 scanning lines) scheme by the signal sort discriminator 2. The signal sort data "480p" being the result of the discrimination is supplied to the setting data memory 3 and the controller 4. Here, if the setting data of a storage location designated in accordance with the signal sort data "480p" and the signal supply source data "DVD" from the input signal selection circuit 1 is "off" in the setting data memory 3, then this setting data "off" is read out by the controller 4.

If, for the signal sort data "480p" in the DVD playback mode, the setting data "off" has been read out from the setting data memory 3 by the controller 4, then the controller 4 instructs the pulldown detector 5 to execute no pulldown detection operation as shown in FIG. 2, it instructs the changeover switch 7 to select "through", it instructs the picture quality adjustment circuit 8 to execute the "sharp" process of high level and the two-dimensional noise reduction process of medium level, it instructs the frame rate converter 9 to perform no conversion, and it instructs the sequence generation circuit 10 to implement the 60 Hz drive sequence.

Owing to the instructions, the output video signal of the DVD player 13 as relayed by the changeover switch SW1 is supplied to the picture quality adjustment circuit 8 through the changeover switch 7 without passing through the I/P converter 6. The other operations are the same as in the case where the setting data "off" has been read out from the setting data memory 3 when the signal sort data is "480i" in the DVD playback mode.

If, for the signal sort data "480p" in the DVD playback mode, the setting data "advanced" has been read out from the setting data memory 3 by the controller 4, then the controller 4 instructs the pulldown detector 5 to execute the pulldown detection operation as shown in FIG. 2, it instructs the changeover switch 7 to select "through", it instructs the picture quality adjustment circuit 8 to execute the "sharp" process of medium level and the two-dimensional noise reduction process of low level, it instructs the frame rate converter 9 to perform the conversion, and it instructs the sequence generation circuit 10 to implement the 72 Hz drive sequence.

Owing to the instructions, the output video signal of the DVD player 13 as relayed by the changeover switch SW1 is supplied to the picture quality adjustment circuit 8 through the changeover switch 7 without passing through the pulldown detector 5. The other operations are the same as in the case where the setting data "advanced" has been read out from the setting data memory 3 when the signal sort data is "480i" in the DVD playback mode.

Further, in a case where a digital-broadcast reception mode based on the receiving tuner 14 for the digital broadcast has been selected by the user's operation, the selection positions of the changeover switches SW1 and SW2 become the side of the video signal input terminal INV4 and the side of the external flag input terminal INF4 in accordance with the signal supply source data "digital broadcast" from the input signal selection circuit 1, respectively. The output video signal of the receiving tuner 14 as relayed by the changeover switch SW1 is discriminated by the signal sort discriminator 2. Besides, if the output flag of the receiving tuner 14 is relayed and supplied to the pulldown detector 5 by the changeover switch SW2, then the pulldown detector 5 supplies the I/P converter 6 with a signal which corresponds to whether or not a content or video signal indicated by the output flag is the video signal of film source, without performing the pulldown detection operation.

When the signal sort data is "480i", "480p", "720p ("progressive" of 720 scanning lines)" or "1080i ("interlace" of 1080 scanning lines)" in the digital-broadcast reception mode, individual operations are executed as indicated by the corresponding relations in FIG. 2. The respective operations are similar to the above operations for the signal sort data "480i" or "480p" in the DVD playback mode, and the description of the operations is repetitious, so that the operations shall not be further described here.

Figure 4:
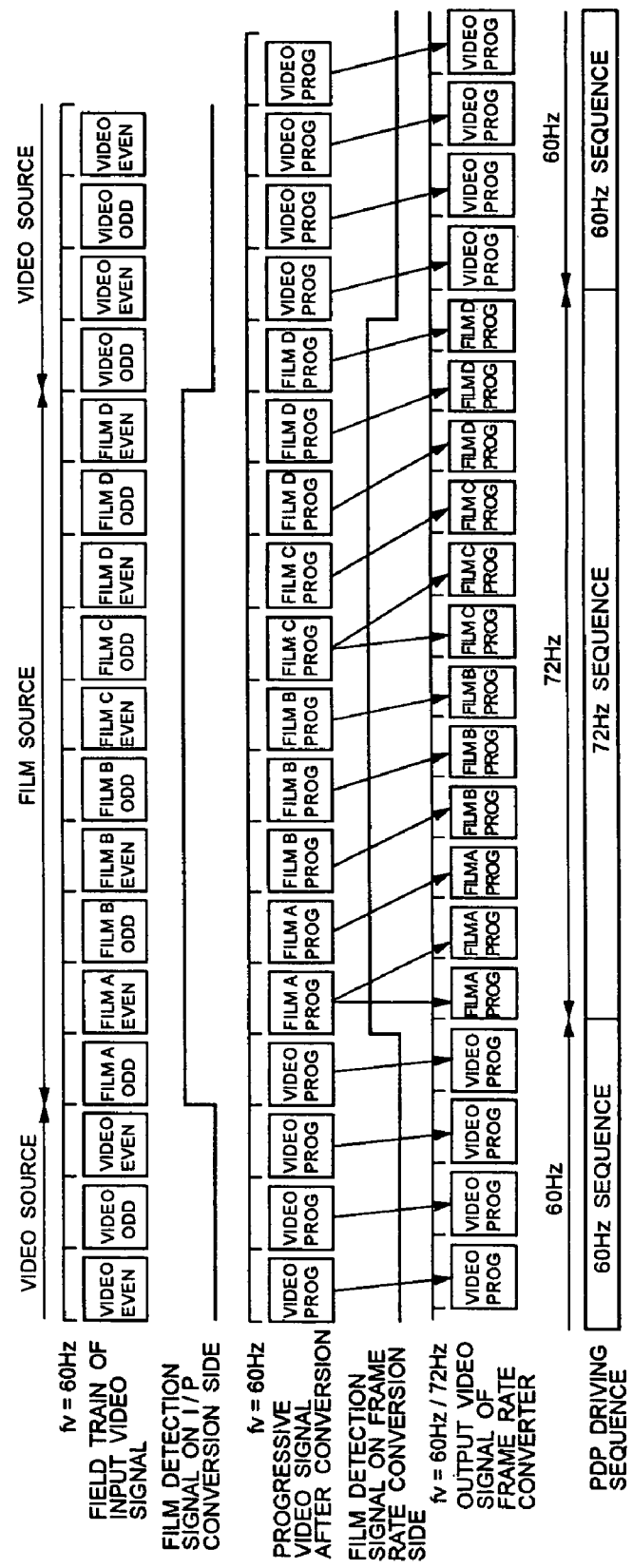
FIG. 4 is a diagram showing the operating states of the individual units of the apparatus in FIG. 1, at the respective synchronous timings thereof in the case where an input video signal is a video signal of NTSC format.

FIG. 4 illustrates the interlace/progressive conversion and the frame rate conversion. As shown in FIG. 4, the video signal of NTSC format is a signal in which a first field "Video odd" and a second field "Video even" are repeated at a vertical synchronizing frequency of fv=60 Hz. Each time the I/P converter 6 writes the video signal corresponding to 2 fields (first field "Video odd" and second field "Video even"), namely, one frame, into a first frame memory not shown, it reads the video signal corresponding to one frame, twice at the vertical synchronizing frequency of fv=60 Hz. Thus, the input video signal can be converted into a progressive video signal "Video prog" having 525 scanning lines. The frame rate converter 9 writes the supplied progressive video signal into a second frame memory not shown, and it reads the progressive video signal "Video prog" corresponding to one frame as written into the second frame memory, at the vertical synchronizing frequency of fv=60 Hz. That is, the frame rate converter 9 outputs the same video signal "Video prog" as the written video signal "Video prog". The outputted video signal is supplied to the PDP driving sequence generation circuit 10. This PDP driving sequence generation circuit 10 drives the PDP or display panel 21 in the 60 Hz sequence in accordance with the video signal having the vertical synchronizing frequency of fv=60 Hz.

As shown in FIG. 4, the video signal of film source conforming to the NTSC format is a video signal of 2-3 pulldown scheme in which a field train consists of fields "Film A odd", "Film A even", "Film B odd", "Film B even", "Film B odd", . . . "Film A odd" denotes the first field of a frame A, and "Film A even" the second field of the frame A. The vertical synchronizing frequency of the video signal of the NTSC format is fv=60 Hz. Therefore, each time the I/P converter 6 writes the video signal corresponding to 2 fields (first field "Film A odd" and second field "Film A even"), into the first frame memory, it reads the video signal "Film A prog" corresponding to one frame, twice at the vertical synchronizing frequency of fv=60 Hz. Further, each time the I/P converter 6 writes the video signal corresponding to 2 fields (first field "Film B odd" and second field "Film B even"), into the first frame memory, it reads the video signal "Film B prog" corresponding to one frame, three times at the vertical synchronizing frequency of fv=60 Hz. The last field "Film B odd" of the 5 successive fields of the input video signal is neglected. Owing to the repetition of such operations, the input video signal can be converted into the progressive video signal having 525 scanning lines. The frame rate converter 9 writes the supplied progressive video signal into the second frame memory, it reads the progressive video signal "Video prog" corresponding to one frame as written into the second frame memory, at a vertical synchronizing frequency of fv=72 Hz, and it supplies the read-out video signal to the PDP driving sequence generation circuit 10. Besides, in the readout of the video signal corresponding to one frame, the same frame is read out twice every 5th frame. As shown in FIG. 4, the frame "Film A prog", a frame "Film C prog", . . . are read out twice, whereby the same frame succeeds over 3 frames in the video signal having the vertical synchronizing frequency of fv=72 Hz as obtained through the frame rate conversion. The PDP driving sequence generation circuit 10 drives the PDP or display panel 21 in the 72 Hz sequence in accordance with the video signal having the vertical synchronizing frequency of fv=72 Hz.

Incidentally, although a case where a video signal of PAL system is inputted has not been mentioned in the above embodiment, the vertical synchronizing frequency of the video signal conforming to the PAL system is 50 Hz. Therefore, the I/P converter 6 repeats forming a progressive video signal of one frame out of 2 fields of the video signal, and then outputting the progressive video signal twice in succession. The frame rate converter 9 converts the progressive video signal whose vertical synchronizing frequency is 50 Hz, into a video signal which has a frame rate of 75 Hz.

The foregoing embodiments have mentioned the construction in which the video signal having the vertical synchronizing frequency of 50 Hz (the video signal of film source conforming to the PAL system) is converted into the video signal having the frame rate of 75 Hz, and the construction in which the video signal having the vertical synchronizing frequency of 60 Hz (the video signal of film source conforming to the NTSC format) is converted into the video signal having the frame rate of 72 Hz. However, the present invention is not restricted to the constructions, but it may well convert the video signal whose vertical synchronizing frequency is 50 Hz, into a video signal which has a frame rate of (25×N)Hz (where N denotes a positive integer) such as 25 Hz or 100 Hz, and the video signal whose vertical synchronizing frequency is 60 Hz, into a video signal which has a frame rate of (24×N)Hz (where N denotes a positive integer) such as 24 Hz, 48 Hz or 96 Hz.

Besides, in a case where a video signal whose vertical synchronizing frequency is (24×M)Hz (where M denotes a positive integer) (for example, a video signal of 24 Hz) is inputted, it may well be similarly converted into a video signal which has a frame rate of (24×N)Hz (where N denotes a positive integer, and M≦N holds) (for example, a video signal of 48 Hz or 72 Hz). Also, in a case where a video signal whose vertical synchronizing frequency is (25×M)Hz (where M denotes a positive integer) (for example, a video signal of 25 Hz) is inputted, it may well be similarly converted into a video signal which has a frame rate of (25×N)Hz (where N denotes a positive integer, and M≦N holds) (for example, a video signal of 50 Hz or 75 Hz).

Further, although the case of employing the PDP as the display panel has been mentioned in the foregoing embodiments, the present invention is not restricted to the PDP. The present invention is also applicable to another flat panel display which employs organic electroluminescent elements or the like luminous elements.

As described above, according to the present invention, the operation of at least one of film source discrimination means, interlace/progressive conversion means and frame rate conversion means is controlled in accordance with an operation mode which corresponds to the sort and signal supply source of an input video signal. Accordingly, conversion operations can be performed in appropriate operation modes for video signals of both film source and video source, so that enhancements in display qualities can be attained.

This application is based on Japanese Patent Application No. 2003-204412 which is herein incorporated by reference.

What is claimed is:

1. A video signal conversion apparatus wherein an input video signal is converted into a progressive video signal of predetermined frame rate, comprising:
   a film source discrimination unit which discriminates whether or not the input video signal is a video signal of film source as based on a film;
   an interlace/progressive conversion unit which, when the input video signal is an interlaced video signal, converts the input video signal into the progressive video signal by a conversion method conforming to a result of the discrimination by said film source discrimination unit and then outputs the progressive video signal, and which, when the input video signal is not the interlaced video signal, outputs the video signal as it is;
   a frame rate conversion unit which converts the output video signal of said interlace/progressive conversion unit into a video signal of higher frame rate in accordance with the result of the discrimination by said film source discrimination unit;
   an input signal discrimination unit which discriminates a sort and a signal supply source of the input video signal;
   an operation mode setting unit which sets operation modes of individual sorts of video signals of each of a plurality of signal supply sources; and
   a control unit which obtains from said operation mode setting unit, the operation mode corresponding to the sort and the signal supply source of the input video signal as discriminated by said input signal discrimination unit, and which controls an operation of at least one said film source discrimination unit, said interlace/ progressive conversion unit and said frame rate conversion unit in accordance with the obtained operation mode, wherein said input signal discrimination unit includes a synchronizing-signal detection unit which detects a vertical synchronizing signal of the input video signal, said interlace/progressive conversion unit outputs the progressive video signal in synchronism with the vertical synchronizing signal of the input video signal, and wherein when the vertical synchronizing frequency of the input video signal is 50Hz, said interlace/progressive conversion unit repeats forming the progressive video signal corresponding to one frame, out of 2 fields of the input video signal, so as to output the progressive video signal twice in succession; and when the vertical synchronizing frequency of the input video signal is 60Hz, said interlace/progressive conversion unit repeats forming the progressive video signal corresponding to one frame, out of initial 2 fields of 5 fields of the input video signal, so as to output the progressive video signal twice in succession, forming the progressive video signal corresponding to one frame, out of 2 subsequent fields, so as to output the progressive video signal twice in succession, and neglecting one remaining field.

2. A video signal conversion apparatus wherein an input video signal is converted into a progressive video signal of predetermined frame rate, comprising:
- a film source discrimination unit which discriminates whether or not the input video signal is a video signal of film source as based on a film;
- an interlace/progressive conversion unit which, when the input video signal is an interlaced video signal, converts the input video signal into the progressive video signal by a conversion method conforming to a result of the discrimination by said film source discrimination unit and then outputs the progressive video signal, and which, when the input video signal is not the interlaced video signal, outputs the video signal as it is;
- a frame rate conversion unit which converts the output video signal of said interlace/progressive conversion unit into a video signal of higher frame rate in accordance with the result of the discrimination by said film source discrimination unit;
- an input signal discrimination unit which discriminates a sort and a signal supply source of the input video signal;
- an operation mode setting unit which sets operation modes of individual sorts of video signals of each of a plurality of signal supply sources; and
- a control unit which obtains from said operation mode setting unit, the operation mode corresponding to the sort and the signal supply source of the input video signal as discriminated by said input signal discrimination unit, and which controls an operation of at least one said film source discrimination unit, said interlace/progressive conversion unit and said frame rate conversion unit in accordance with the obtained operation mode, wherein when the result of the discrimination by said film source discrimination unit indicates the film source, said frame rate conversion unit converts the progressive video signal as to which a vertical synchronizing frequency of the input video signal is 50 Hz, into a video signal which has a frame rate of (25×N)Hz (where N denotes a positive integer); and when the result of the discrimination by said film source discrimination unit indicates the film source, said frame rate conversion unit converts the progressive video signal as to which a vertical synchronizing frequency of the input video signal is 60 Hz, into a video signal which has a frame rate of (24×N)Hz (where N denotes a positive integer).

3. video signal conversion apparatus wherein an input video signal is converted into a progressive video signal of predetermined frame rate, comprising:
- a film source discrimination unit which discriminates whether or not the input video signal is a video signal of film source as based on a film;
- an interlace/progressive conversion unit which, when the input video signal is an interlaced video signal, converts the input video signal into the progressive video signal by a conversion method conforming to a result of the discrimination by said film source discrimination unit and then outputs the progressive video signal, and which, when the input video signal is not the interlaced video signal, outputs the video signal as it is;
- a frame rate conversion unit which converts the output video signal of said interlace/progressive conversion unit into a video signal of higher frame rate in accordance with the result of the discrimination by said film source discrimination unit;
- an input signal discrimination unit which discriminates a sort and a signal supply source of the input video signal;
- an operation mode setting unit which sets operation modes of individual sorts of video signals of each of a plurality of signal supply sources; and
- a control unit which obtains from said operation mode setting unit, the operation mode corresponding to the sort and the signal supply source of the input video signal as discriminated by said input signal discrimination unit, and which controls an operation of at least one said film source discrimination unit, said interlace/progressive conversion unit and said frame rate conversion unit in accordance with the obtained operation mode, wherein when a vertical synchronizing frequency of the input video signal is (25×M)Hz (where M denotes a positive integer) based on the film source, said frame rate conversion unit converts the input video signal into a video signal which has a frame rate (25×N)Hz (where N denotes a positive integer, and M≦N holds).

4. A video signal conversion apparatus wherein an input video signal is converted into a progressive video signal of predetermined frame rate, comprising:
- a film source discrimination unit which discriminates whether or not the input video signal is a video signal of film source as based on a film;
- an interlace/progressive conversion unit which, when the input video signal is an interlaced video signal, converts the input video signal into the progressive video signal by a conversion method conforming to a result of the discrimination by said film source discrimination unit and then outputs the progressive video signal, and which, when the input video signal is not the interlaced video signal, outputs the video signal as it is;
- a frame rate conversion unit which converts the output video signal of said interlace/progressive conversion unit into a video signal of higher frame rate in accordance with the result of the discrimination by said film source discrimination unit;
- an input signal discrimination unit which discriminates a sort and a signal supply source of the input video signal;

an operation mode setting unit which sets operation modes of individual sorts of video signals of each of a plurality of signal supply sources; and a control unit which obtains from said operation mode setting unit, the operation mode corresponding to the sort and the signal supply source of the input video signal as discriminated by said input signal discrimination unit, and which controls an operation of at least one said film source discrimination unit, said interlace/progressive conversion unit and said frame rate conversion unit in accordance with the obtained operation mode, wherein when a vertical synchronizing frequency of the input video signal is (24×M)Hz (where M denotes a positive integer) based on the film source, said frame rate conversion unit converts the input video signal into a video signal which has a frame rate (24×N)Hz (where N denotes a positive integer, and M≦N holds).

5. A video signal conversion apparatus wherein an input video signal is converted into a progressive video signal of predetermined frame rate, comprising:

a film source discrimination unit which discriminates whether or not the input video signal is a video signal of film source as based on a film;

an interlace/progressive conversion unit which, when the input video signal is an interlaced video signal, converts the input video signal into the progressive video signal by a conversion method conforming to a result of the discrimination by said film source discrimination unit and then outputs the progressive video signal, and which, when the input video signal is not the interlaced video signal, outputs the video signal as it is;

a frame rate conversion unit which converts the output video signal of said interlace/progressive conversion unit into a video signal of higher frame rate in accordance with the result of the discrimination by said film source discrimination unit;

an input signal discrimination unit which discriminates a sort and a signal supply source of the input video signal;

an operation mode setting unit which sets operation modes of individual sorts of video signals of each of a plurality of signal supply sources; and a control unit which obtains from said operation mode setting unit, the operation mode corresponding to the sort and the signal supply source of the input video signal as discriminated by said input signal discrimination unit, and which controls an operation of at least one said film source discrimination unit, said interlace/progressive conversion unit and said frame rate conversion unit in accordance with the obtained operation mode, wherein when the result of the discrimination by said film source discrimination unit indicates the film source, said frame rate conversion unit converts the progressive video signal as to which a vertical synchronizing frequency of the input video signal is 50 Hz, into a video signal which has a frame rate of (25×N)Hz (where N denotes a positive integer).

6. A video signal conversion apparatus wherein an input video signal is converted into a progressive video signal of predetermined frame rate, comprising:

a film source discrimination unit which discriminates whether or not the input video signal is a video signal of film source as based on a film;

an interlace/progressive conversion unit which, when the input video signal is an interlaced video signal, converts the input video signal into the progressive video signal by a conversion method conforming to a result of the discrimination by said film source discrimination unit and then outputs the progressive video signal, and which, when the input video signal is not the interlaced video signal, outputs the video signal as it is;

a frame rate conversion unit which converts the output video signal of said interlace/progressive conversion unit into a video signal of higher frame rate in accordance with the result of the discrimination by said film source discrimination unit;

an input signal discrimination unit which discriminates a sort and a signal supply source of the input video signal;

an operation mode setting unit which sets operation modes of individual sorts of video signals of each of a plurality of signal supply sources; and a control unit which obtains from said operation mode setting unit, the operation mode corresponding to the sort and the signal supply source of the input video signal as discriminated by said input signal discrimination unit, and which controls an operation of at least one said film source discrimination unit, said interlace/progressive conversion unit and said frame rate conversion unit in accordance with the obtained operation mode, wherein when the result of the discrimination by said film source discrimination unit indicates the film source, said frame rate conversion unit converts the progressive video signal as to which a vertical synchronizing frequency of the input video signal is 60 Hz, into a video signal which has a frame rate of (24×N)Hz (where N denotes a positive integer).

* * * * *

UNITED STATES PATENT AND TRADEMARK OFFICE
CERTIFICATE OF CORRECTION

PATENT NO. : 7,268,820 B2
APPLICATION NO. : 10/893409
DATED : September 11, 2007
INVENTOR(S) : Hirofumi Honda, Tetsuya Shigeta and Tetsuro Nagakubo It is certified that error appears in the above-identified patent and that said Letters Patent is hereby corrected as shown below:

Column 12, line 67, insert --of-- between "one" and "said"

Column 13, line 56, insert --of-- between "one" and "said"

Column 14, line 36, insert --of-- between "one" and "said"

Column 15, line 9, insert --of-- between "one" and "said"

Column 15, line 43, replace
"plurality of signal supply sources; and a control unit"
with
--plurality of signal supply sources; and a control unit--

Column 15, line 48, insert --of-- between "one" and "said"

Signed and Sealed this

Twentieth Day of May, 2008

JON W. DUDAS
*Director of the United States Patent and Trademark Office*